United States Patent
Swanson

(12) 
(10) Patent No.: US 7,309,187 B2
(45) Date of Patent: Dec. 18, 2007

(54) RELEASABLE KEYLESS BUSHING ASSEMBLY

(76) Inventor: Brian D. Swanson, 480 S. Irmen Dr., Addison, IL (US) 60101

( * ) Notice: Subject to any disclaimer, the term of this patent is extended or adjusted under 35 U.S.C. 154(b) by 20 days.

(21) Appl. No.: 10/857,393

(22) Filed: May 28, 2004

(65) Prior Publication Data

US 2005/0265779 A1    Dec. 1, 2005

(51) Int. Cl.
- B25G 3/20 (2006.01)
- F16B 2/00 (2006.01)
- F16B 7/04 (2006.01)

(52) U.S. Cl. .............. 403/373; 403/367; 403/368; 403/369; 403/374.1; 403/374.2; 403/374.3; 403/374.4

(58) Field of Classification Search ........... 403/309, 403/314, 373, 374.1, 374.4, 409.1, 1, 374.2, 403/374.3, 367–370
See application file for complete search history.

(56) References Cited

U.S. PATENT DOCUMENTS

| | | |
|---|---|---|
| 3,849,014 A * | 11/1974 | Maxey ............... 403/370 |
| 3,849,015 A | 11/1974 | Peter et al. |
| 3,957,381 A * | 5/1976 | Schafer ............... 403/16 |
| 4,304,502 A * | 12/1981 | Stratienko ............ 403/370 |
| 4,348,132 A | 9/1982 | Mullenberg |
| 4,354,769 A | 10/1982 | Peter |
| 4,702,637 A | 10/1987 | Muellenberg |
| 5,269,622 A | 12/1993 | Mullenberg |
| 5,374,135 A | 12/1994 | Folsom et al. |
| 5,474,403 A | 12/1995 | Hetrich |
| 5,639,176 A * | 6/1997 | Mullenberg ........... 403/282 |
| 5,865,561 A | 2/1999 | Muellenberg |

\* cited by examiner

*Primary Examiner*—Gregory J. Binda
*Assistant Examiner*—Nahid Amiri

(57) ABSTRACT

A releasable self-centering keyless bushing assembly connects two machine elements, such as a hub to a shaft. The assembly includes an outer ring having two tapered inner peripheral surfaces, wherein each of the tapered surfaces has a different taper angle, and an inner cone having two tapered outer peripheral surfaces that have identical taper angles to the tapered peripheral surfaces of the outer ring. The outer ring and the inner cone are drawn together by screws that expand and contract the assembly to connect the hub to the shaft.

14 Claims, 7 Drawing Sheets

RELEASABLE KEYLESS BUSHING ASSEMBLY

FIELD OF INVENTION

The invention relates to a releasable keyless bushing assembly for connecting two machine elements, such as a hub having a cylindrical aperture and a shaft having a cylindrical outer surface to hold the shaft concentrically in the hub. More particularly, the invention relates to an expanding/contracting keyless bushing assembly that is readily releasable. The keyless bushing assembly transmits torque and thrust with high bending moment torque capabilities.

BACKGROUND OF THE INVENTION

There are various types of expanding/contracting conical ring or rings that utilize frictional wedge designs in place of keys or interference forced fit to connect machine elements and transmit torque. An examination of the prior art includes the following:

U.S. Pat. No. 3,957,381 to Schafer discloses a connector that includes a double-cone that produces a highly concentrated contact pressure and slight variations in tightening the clamping screws result in installation concentricity error. Given the number of clamping screws, it was necessary to adhere to a restricted installation tightening procedure. These restrictions resulted in the need for external centering shims or piloted machine elements.

U.S. Pat. No. 4,304,502, to Stratienko describes a connector that provides for a much less contact pressure than Schafer's U.S. Pat. No. 3,957,391, but does not address the problem of installation concentricity error.

U.S. Pat. No. 5,374,135 to Folsom and U.S. Pat. No. 5,474,403 to Hetrich address the known installation difficulty of mounting machine elements with clamping devices that utilize multiple screws. The devices taught by U.S. Pat. Nos. 5,374,135 and 5,474,403 are limited by the relatively low torque capacity that can be achieved by one large nut and their intolerance to bending moment. The common feature of the clamping devices shown by these two patents is that the conical rings and the circumferential webs of the double conical rings have the bores for the tensioning screws and the forcing screws on a common pitch circle and at the same spacings. As a consequence, at some locations on the circumference bores for forcing screws are arranged in the positions in which tensioning screws would normally be located. This design considerably simplifies the production on a drilling unit with corresponding dividing apparatus.

The uniform spacings, while providing advantages in terms of production, nevertheless involve problems regarding the correct installation of the front conical ring, the front conical ring being directed toward the caps of the tensioning screws. The problem of misalignment can occur whether assembly takes place at the factory or on site, e.g. when fastening belt-drive drums for conveying belts in mining or the like. Incorrect installation can easily occur because it is not easy to see, from the front, whether the conical ring is in the correct angular position with respect to the double conical ring. When in the correct position, the various types of bores coincide precisely. In the event of careless installation, the conical surfaces may not coincide, with one of the conical axis being misdirected from being longitudinally parallel. Sometimes the threaded bores in the front conical ring, (the front conical ring being directed toward the caps of the tensioning screws), and the threaded bores for releasing the front conical ring from the double conical ring, are located opposite and in alignment with threaded bores in the circumferential web of the double conical ring which are provided for the release of the conical ring directed away from the caps of the tensioning screws. Since the number of forcing screws for releasing the front conical ring and the rear conical ring are equal and the forcing screws are distributed uniformly over the circumference, all the threaded bores in the front conical ring may be located opposite the threaded bores in the circumferential web.

After the relative positions of the rings have been set, the forcing screws are screwed into the threaded bores of the front conical ring and come into contact with the threaded bores in the circumferential web. As a result, it is more difficult to force off the front conical ring because there is no real abutment to effect the necessary leverage. In addition, the threaded bores in the circumferential web are destroyed such that, in some circumstances, it is no longer possible to force off the rear conical ring and consequently the entire conical tensioning assembly can no longer be released. U.S. Pat. No. 5,269,622 to Mullenberg discusses the problem of releasability, but proposes a structure in which the same screws are used to tighten and loosen the connector.

The prior art discusses the problem of releasing a connector assembly after it has been installed. It may be a number of years before this situation arises, when release of the connector assembly is made more difficult by corrosion and dirt. Accordingly, when such a case does occur, the damage is considerable.

The primary objective of the invention is to overcome the problems of the prior art and provide a self centering keyless bushing capable of transmitting high amounts of torque, thrust and bending moment connection for rotationally and axially securing machine elements where the machine element is drivingly coupled to a shaft. It is also an objective of the present invention to provide a keyless bushing that is simple to install and that is readily releasable.

BRIEF DESCRIPTION OF THE INVENTION

The present invention relates to a self-centering keyless bushing assembly that is fitted into a space between a hub and a shaft, that on installation simultaneously expands and contracts radially and axially to secure the hub and shaft together and to transmit torque, thrust and bending moments between the hub and shaft. The keyless bushing assembly includes an outer ring having two tapered inner peripheral surfaces, wherein each of the tapered surfaces has a different taper angle, and an inner cone having two tapered outer peripheral surfaces, wherein each of the tapered surfaces has a different taper angle. The respective tapered peripheral surfaces of the outer ring and inner cone have identical taper angles and the tapered peripheral surfaces of the outer ring bear on the tapered peripheral surfaces of the inner cone.

The keyless bushing is installed by tightening a plurality of installation screws positioned to draw the outer ring and the inner cone together, thus expanding/contracting the keyless bushing. Both the outer ring and the inner cone have a plurality of corresponding, aligned holes which are parallel to the longitudinal axis and disposed in a circle on the end of the bushing. The holes in either the outer ring or the inner cone are tapped to engage the installation screws. Either the outer ring or the inner cone may be tapped to fit the installation screws.

A plurality of installation screws are arranged to protrude through the untapped holes and engage the respective tapped holes. When the installation screws are tightened, the outer ring is drawn longitudinally toward the inner cone and the tapered surfaces of the ring bear against the tapered surfaces of the cone producing first axial forces. As the tapered surfaces meet, the bushing expands outwardly to fill any space between the outer cone and the hub. Next, the bushing contracts inwardly to fill any space between the inner cone and the shaft. Finally, the bushing assembly expands/contracts to securely clamp the shaft to the hub. The steep taper surfaces tend to resist the first axial forces but the shallow taper surface slide relative to each thereby clamping the inner cone and outer ring together.

DESCRIPTION OF THE DRAWINGS

The present invention will be better understood by reference to the appended drawings in which.

DETAILED DESCRIPTION OF THE INVENTION

Figure 1:
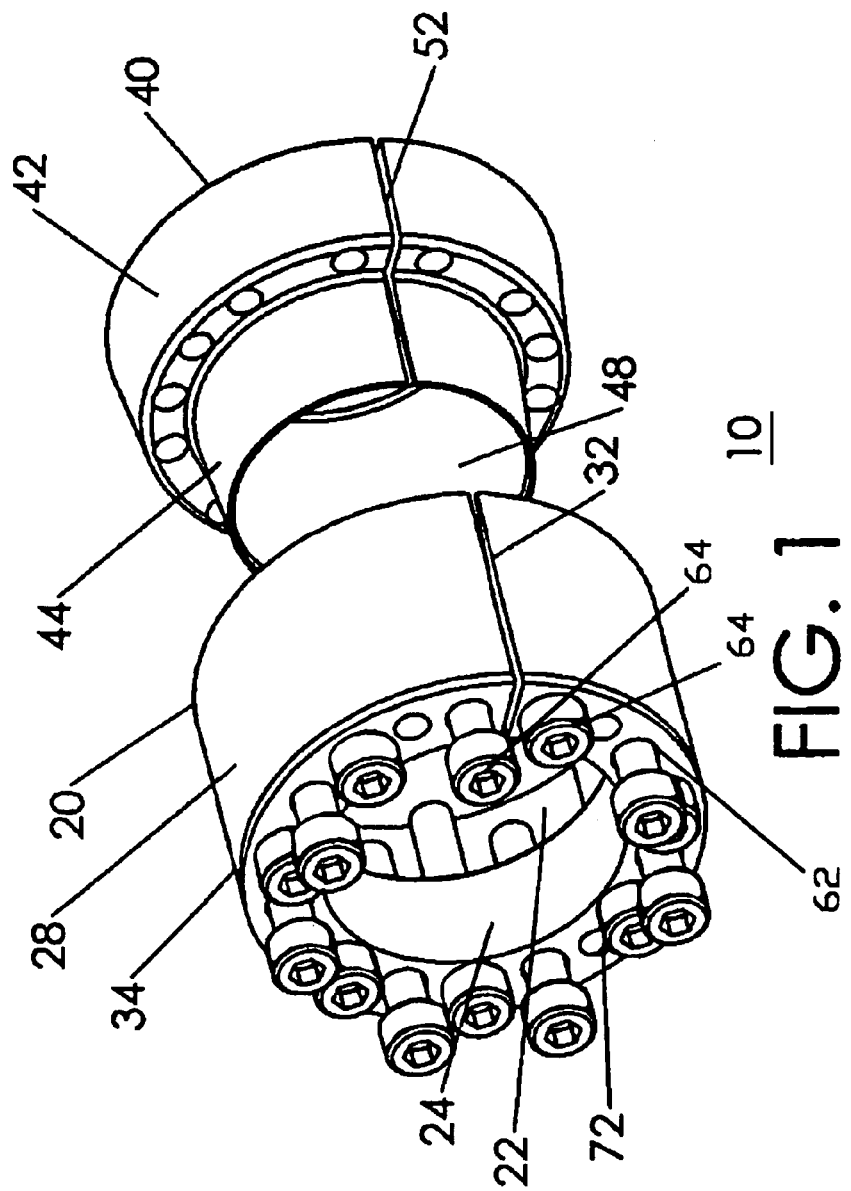
FIG. 1 is an isometric view of the keyless bushing assembly with the inner component removed from the outer component.
Figure 2:
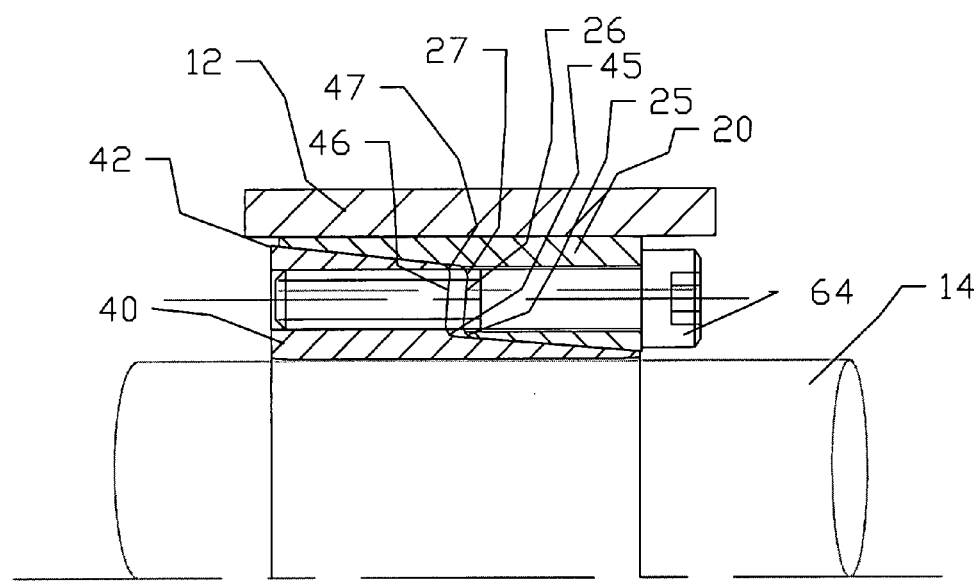
FIG. 2 is a sectional side view of a portion of the keyless bushing assembly.

The invention relates to a self-centering keyless bushing assembly that simultaneously expands and contracts radially and axially, securing machine elements together, to transmit torque, thrust and bending moments between the machine elements. As shown in the drawings, the keyless bushing assembly 10 has a longitudinal axis and is adapted to be fitted into the space between a hub 12 and a shaft 14 for clamping and unclamping hub 12 and shaft 14 to and from each other. Keyless bushing assembly 10 comprises an outer ring 20 and an inner cone 40. Outer ring 20 has outer cylindrical surface 28 and two inner tapered peripheral surfaces 22 and 24, wherein each of the tapered surfaces has a different taper angle. Inner cone 40 has an inner cylindrical surface and two outer tapered peripheral surfaces 42 and 44, wherein each of the tapered surfaces has a different taper angle. The tapered peripheral surfaces 22 and 24 of outer ring 20 have the same length and taper angle as tapered peripheral surfaces 42 and 44 of the inner cone 40.

The use of two tapered surfaces with different taper angles provides increased clamping force in a bushing assembly with a relatively short longitudinal length, with very uniform pressure applied to the corresponding shaft and hub. Moreover, this configuration also provides improved releasability. Generally, the taper angle of the steeper surface should be greater than 6.0° and preferably between about 6.5° and 8.0° relative to the longitudinal axis 36, while the taper angle of the shallower surface should be less than 6.0° and preferably between about 4.0° and 5.5° relative to the longitudinal axis 36. In the most preferred embodiment, the shallow angle is about 4.5° and the steeper angle is about 6.5°. Shallow tapers of about 4.5° can be considered "self-locking" while the steeper tapers of about 6.5° can be considered self-releasing.

Preferably, the length of the steeper surfaces is about equal to the length of the shallower surface.

The use of two tapered surfaces with different taper angles provides uniform normal clamping force along the length of the keyless bushing assembly both on hub 12 and shaft 14, allowing the use of a smaller hub diameter to contain the normal force and thus transmit the torque and or thrust. This is exceptionally important for bushings that are subjected to bending moments in which point cyclical contact, caused by shaft center line bending twice per revolution and corresponding movement between the shaft and bushing, the resultant contact can cause fretting corrosion to the shaft that may create a shaft notch factor, which can catastrophically fail.

Both ring 20 and cone 40 are preferably interrupted by longitudinal slots 32 and 52 that allow ring 20 and cone 40 to expand and contract. The keyless bushing assembly, of the present invention may be used with no longitudinal slots, but the use of longitudinal slots allows the bushing to expand/contract to a greater extent than a, comparable bushing with no longitudinal slots.

The keyless bushing is installed-by using a plurality of installation screws 64 positioned to draw the two components together, thus expanding/contracting the keyless bushing. The installation screws 64 are distributed along bolt circle 60 on the end 30 of ring 20. Alternatively,, the installation screws 64 may be distributed along a bolt circle (not shown) on the end 50 of inner cone 40. Bolt circle 60 is centered between the inside diameter and the outside diameter of keyless bushing 10 in order to uniformity draw the two components together. Centering the bolt circle between the inside diameter and the outside diameter also allows the use of installation screws 64 having a maximum head size. To move the bolt circle on either side of this center line makes installation much more sensitive to misalignment from careless installation and can cause failure by placing uneven stresses on the outer ring or the inner cone as they are drawn together.

Both the outer ring and the inner cone have a plurality of matched holes 62 which are parallel to the longitudinal axis and disposed on installation bolt circle 60 located the end 30 of the ring 20. The holes in either outer ring 20 or inner cone 40 are tapped. A plurality of installation screws 64 are arranged to protrude through the untapped holes and engage the respective tapped holes. When the installation screws 64 are tightened, outer ring 20 is drawn longitudinally toward inner cone 40 and the tapered surfaces 22 and 24 of the ring 20 bear against tapered surfaces 42 and 44 of cone 40 producing first axial forces. When installation screws 64 are initially tightened, outer ring 20 is drawn longitudinally toward inner cone 40, the tapered surfaces meet and the bushing expands outwardly to fill any space between cylindrical surface 28 of outer ring 20 and hub 12. Next, the bushing contracts inwardly to fill any space between cylindrical surface 48 of inner cone 40 and shaft 14. As the installation screws 64 are further tightened and outer ring 20 is drawn further toward inner cone 40, the steeper taper surfaces 22 and 42 tend to resist the first axial forces but the shallower taper surfaces 24 and 44 slide relative to each other thereby clamping the shaft and hub together. In this configuration, shallow tapers 24 and 44 can be considered "self-locking" while the steeper tapers 22 and 42 can be considered self-releasing.

When the installation screws 64 are unscrewed, steeper taper surfaces 22 and 42 release the axial forces while shallow taper surfaces 24 and 44 remain in the locked position. The use of two tapered surfaces with different taper angles provides improved releasability. It is postulated that the steeper taper used in the present invention is essentially self releasing when the installation screws 64 are removed. Consequently, jack screws 74 only need to overcome the force generated by the shallow taper in order to complete the release of the keyless bushing assembly.

Figure 3:
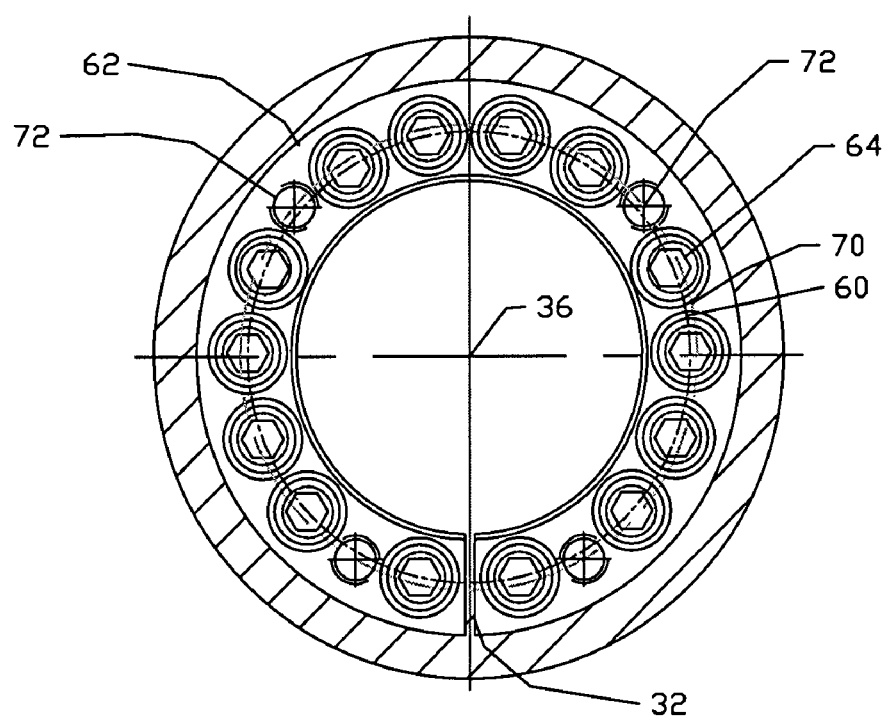
FIG. 3 is an end view of the keyless bushing assembly.
Figure 4:
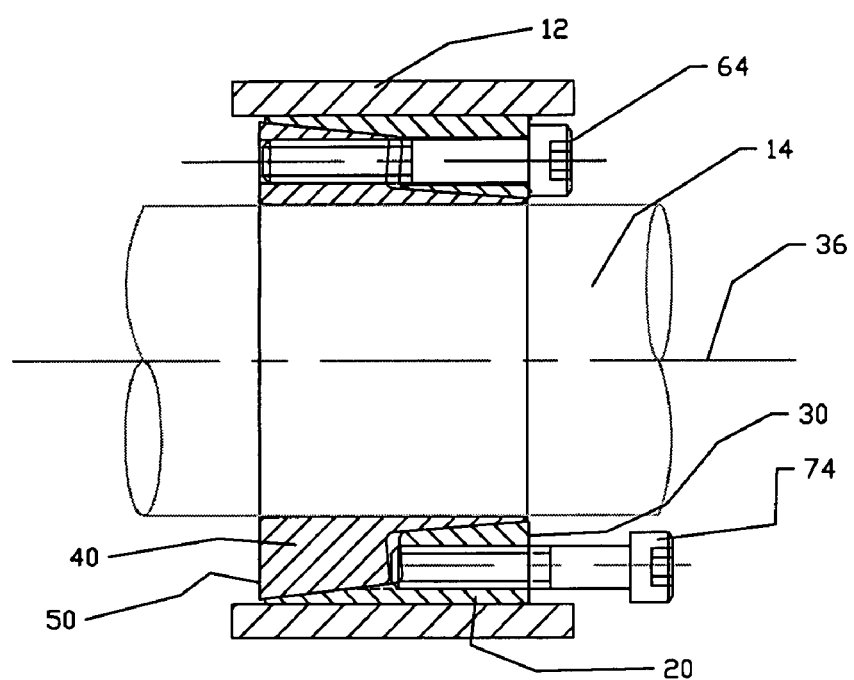
FIG. 4 is a sectional side view of the keyless bushing assembly.

Removal jack screws 74 are preferably located in extraction bolt holes 72 that are arranged on extraction bolt circle 70, positioned outside of the installation bolt circle 60, as shown in FIG. 3. By locating the removal screws 74 closer to the outside diameter than the installation bolt circle 60 center line, fewer removal screws 74 are required. The rule of thumb is that for a self-locking taper angle, 50% of the screws must be dedicated to removal. For example, if a keyless bushing of a selected size used fourteen installation screws 64, the rule-of-thumb would require seven jack screws 74 to separate the self-locking taper. The keyless bushing assembly of the present invention-requires only four removal screws.

The Back Cut

Figure 5:
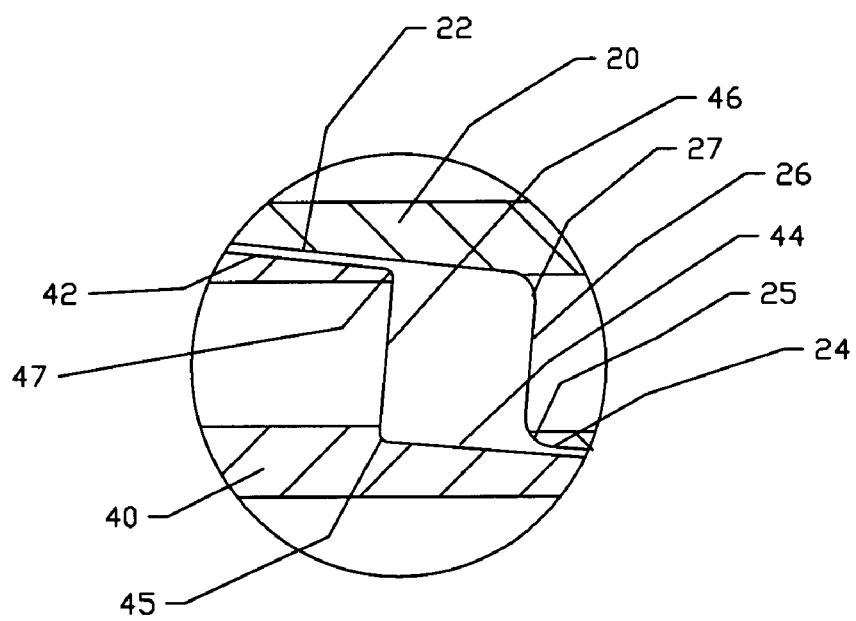
FIG. 5 is a sectional side view of a portion of the keyless bushing assembly showing the back cut between the ring and the cone.

As is shown in FIG. 5, outer ring 20 includes back cut 26 positioned between tapered surface 22 and taper surface 24. Likewise, inner cone 40 includes back cut 46 positioned between tapered surface 42 and taper surface 44. Back cut 26 and back cut 46 should be set at an angle intermediate between the angle of steep taper surface 22 and the angle of shallow taper surface 24 of outer ring 20. The angle of the back cuts 26 and 46 may be between about 3° and 8° from normal to longitudinal axis 36, but in the preferred embodiment back cut 26 and back cut 46 are set at about 5 degrees. The 5 degree back cut allows ring 20 and cone 40 to be drawn closer together or even allow back cut surfaces 26 and 46 to come in contact, thus providing both ring 20 and cone 40 with more resilience. Preferably, the intersection of back cut 26 and tapered surface 24 is rounded to a small radius 25 in ring 20, as shown in FIG. 5. Preferably, the intersection of back-cut 46 and tapered surface 44 is also rounded to a small radius 45 in cone 40, as shown in FIG. 5. Optionally, the intersection of back cut 26 and tapered surface 22 may be rounded to a small radius 27 in ring 20, as shown in FIG. 5. Optionally, the intersection of back cut 46 and tapered surface 42 may also be rounded to a small radius 47 in cone 40, as shown in FIG. 5.

The use of back cuts 26 and 46 reduces the gap between the tapered surfaces and thus increases the contact surface of the opposing tapered surfaces. Thus back cuts 26 and 46 minimize the reduction of normal force found in the center of conventional two-cone bushing assemblies. Also, the stress in the radius transition from the conical surface to the vertical surface is significantly reduced. The 5 degree back cut allows the minimum gap between the two cones to be reduced from a rule of thumb of ½ screw diameter to ¼ screw diameter or less. By reducing this gap through the back cuts, the gap is reduced and "neutral zone" gets smaller. This produces a more uniform normal clamping force distributed both on hub 12 and shaft 14 throughout the longitudinal length of the keyless bushing assembly.

The Transition Zones

Figure 6:
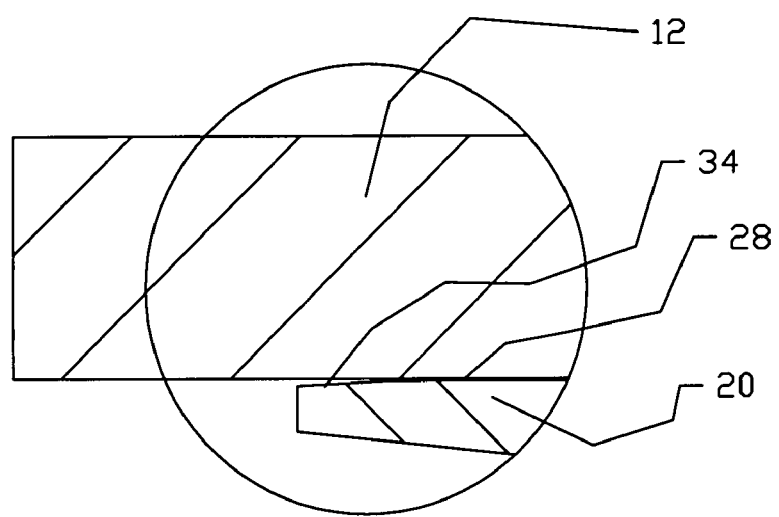
FIG. 6 is a sectional side view of a portion of the keyless bushing ring showing the outer diameter transition zone.

In the preferred embodiment, both ends of outer cylindrical peripheral surface 28 of outer ring 20 are provided with a transition zone 34, as shown in FIG. 6. The transition zones may have an angle of between about 2.5° and 5° relative to longitudinal axis 36, although it is preferred to set the transition zones at an angle of about 3°. The length of each transition zone on said outer cylindrical peripheral surface should be about 4 to about 6 percent of the length of the outer cylindrical peripheral surface.

Figure 7:
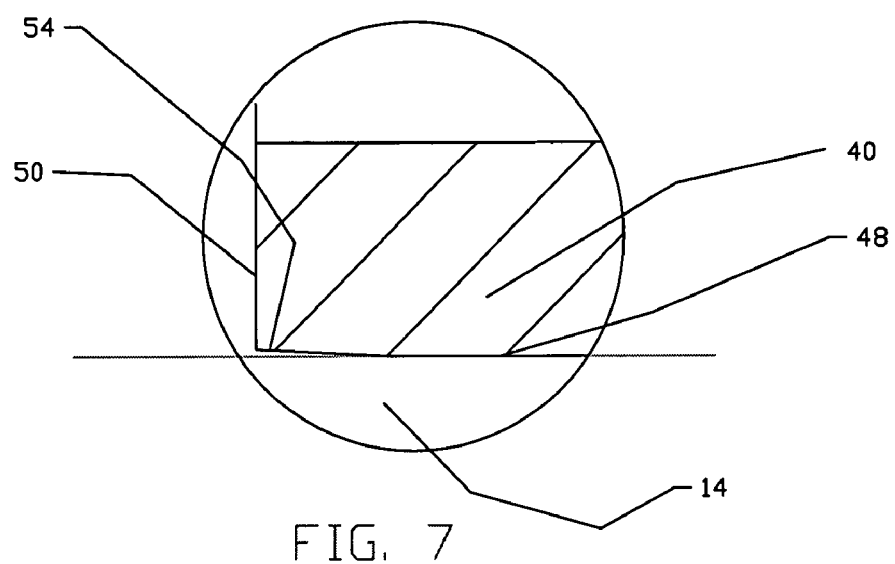
FIG. 7 is a sectional side view of a portion of the keyless bushing cone showing the inner diameter transition zone.

In the preferred embodiment, both ends of inner cylindrical peripheral surface 48 of inner cone 40 are also provided with transition zone 54, as shown in FIG. 7. The transition zones may have an angle of between about 2.5° and 5° relative to longitudinal axis 36, although it is preferred to set the transition zones at an angle of about 3°. The length of each transition zone on said inner cylindrical peripheral surface should be about 4 to about 6 percent of the length of the inner cylindrical peripheral surface.

Transition zones 34 and 54 are not radii or chamfers, but are at a defined angle that provides a "rocking chair" edge. The use of transition zones 34 and 54 on cylindrical peripheral surfaces 28 and 48 avoids the problem of point contact under bending moment loads. The transition zones 34 and 54 act much like a rocking chair in which leaning far forward distributes the load over the arc of the rocker rather than on a point. The transition zone feature is more important on the inner cylindrical surface of the inner cone 40 that contacts the shaft 14 because that is where the contact surface is the smallest and stress concentrations are the highest. Accordingly, the bushing assembly of the present invention may have transition zones on only the inner cylindrical surface. Moreover, transition zones, as described above may be advantageously used on bushing assemblies in which the tapered surfaces have only one taper angle.

Installation Procedure

In the preferred embodiment, the installation screws are divided into at least 2 different sets. Each of the screws includes a code indicia showing the set to which the screw belongs. The code indicia is preferably a color, although the code indicia may take the form of head shapes or drive configurations. Color coded installation screws allow the keyless bushing assembly to be installed faster with better concentricity.

In the preferred embodiment, the installation screws are inserted in installation bolt holes 62 in alternating sets. That is, the installation screws of one set, e.g. the gold screws are placed in alternate holes 62 around bolt circle 60 and the screws of the other set, e.g. the silver screws are placed between the gold screws. The simplified procedure is for the installer to tighten the gold screws to a selected fraction of the final torque level. Then the silver screws are tightened to the same torque level. This procedure is repeated at a greater torque level until all screws have been tightened to the specified final torque level. This procedure allows the keyless bushing assembly to be quickly installed while minimizing concentricity error from careless installation.

Materials of Construction

A wide variety of steel alloys may be used to produce the keyless bushing assemblies of the present invention. Relatively ductile steels are preferred, with yield points of 40 to 60 ksi, minimum a tensile strength of 80 ksi. A steel alloy known as 4140 is most preferred. A steel product sold under the name "stress proof" is preferred for some sizes of keyless bushing assemblies.

The tapered surfaces of the outer ring and inner cone are preferably coated with a lubricant such as molybdenum disulfide in order to reduce the friction between the tapered surfaces as the outer ring and the inner cone are drawn together.

The forms of invention shown and described herein are to be considered only as illustrative. It will be apparent to those skilled in the art that numerous modifications may be made therein without departing from the spirit of the invention and the scope of the appended claims. For example, it is not necessary to form either the outer ring or the inner cone from a single piece. The present invention contemplates either the outer ring or the inner cone (or both) being made from more than one piece.

I claim:

1. A keyless bushing assembly having a longitudinal axis adapted to be disposed in an intermediate space defined between a hub and a shaft for clamping and unclamping the hub and the shaft to and from each other, respectively, the keyless bushing assembly comprising an outer ring and an inner cone:

said outer ring comprising first and second tapered inner peripheral surfaces, said first tapered inner peripheral surface having a different taper angle relative to said longitudinal axis from said second tapered inner peripheral surface, an outer cylindrical peripheral surface, and an end which is perpendicular to said longitudinal axis, and said outer ring having an outer-ring back cut between said first and second tapered inner peripheral surfaces, and said outer-ring back cut being set at an angle of between about 3° and about 8° from normal to said longitudinal axis;

said inner cone comprising first and second tapered outer peripheral surfaces, said first tapered outer peripheral surface having a different taper angle relative to said longitudinal axis from said second tapered outer peripheral surface, an inner cylindrical peripheral surface, and an end which is perpendicular to said longitudinal axis, and said inner cone having an inner-cone back cut between said first and second tapered outer peripheral surfaces and said inner-cone back cut being set at an angle of between about 3° and about 8° from normal to said longitudinal axis;

said first tapered inner peripheral surface having a substantially identical taper angle relative to said longitudinal axis as said first tapered outer peripheral surface, said second tapered inner peripheral surface having a substantially identical taper angle relative to said longitudinal axis as said second tapered outer peripheral surface, said first tapered inner peripheral surface bearing upon said first tapered outer peripheral surface, and said second tapered inner peripheral surface bearing upon said second tapered outer peripheral surface; and a plurality of screws adapted to draw said ring and said cone together to expand said ring and to contract said cone.

2. The keyless bushing assembly described in claim 1, wherein said first tapered inner peripheral surface of said outer ring has a taper angle between about 6.5° and about 8.0° relative to said longitudinal axis and said second tapered inner peripheral surface of said outer ring has a taper angle relative to said longitudinal axis between about 4.0° and about 5.5°.

3. The keyless bushing assembly described in claim 2, wherein said first tapered inner peripheral surface of said outer ring has a taper angle of about 6.5° relative to said longitudinal axis, and said second tapered inner peripheral surface of said outer ring has a taper angle of about 4.5° relative to said longitudinal axis.

4. The keyless bushing assembly described in claim 1, wherein said outer ring comprises a plurality of tapped holes which are parallel to the longitudinal axis and disposed around a periphery of said outer ring end;

said inner cone comprises a plurality of corresponding holes which are parallel to the longitudinal axis and disposed around a periphery of said inner cone end; and said keyless bushing assembly further comprising a plurality of screws each having a shank and threads, wherein said threads of each of said screws engage a respective one of said tapped holes.

5. The keyless bushing assembly described in claim 4, wherein said holes are located on a circle midway between the cylindrical surface of said outer ring and the cylindrical surface of said inner cone.

6. The keyless bushing assembly described in claim 1, wherein said inner cone comprises a plurality of tapped holes which are parallel to the longitudinal axis and disposed around a periphery of said inner cone end;

said outer ring comprises a plurality of corresponding holes which are parallel to the longitudinal axis and disposed around a periphery of said-outer ring end; and said keyless bushing assembly further comprising a plurality of screws each having a shank and threads, wherein said threads of each of said screws engage a respective one of said tapped holes.

7. The keyless bushing assembly described in claim 6, wherein said holes are located on a circle midway between the cylindrical surface of said inner cone and the cylindrical surface of said outer ring.

8. The keyless bushing assembly described in claim 1, wherein said outer-ring back cut is set at an angle of about 5° from normal to said longitudinal axis and said inner-cone back cut is set at an angle of about 5° from normal to said longitudinal axis.

9. The keyless bushing assembly described in claim 1, wherein said screws are classified into a plurality of sets and said screws include indicia showing the set membership of each of said screws.

10. The keyless bushing assembly described in claim 9, wherein said screw indicia is color.

11. The keyless bushing assembly described in claim 1, wherein said inner cylindrical peripheral surface comprises a transition zone at each end.

12. The keyless bushing assembly described in claim 11, wherein the length of each said transition zone on said inner cylindrical peripheral surface is about 4 to about 6 percent of the length of said inner cylindrical peripheral surface.

13. The keyless bushing assembly described in claim 1, wherein said outer cylindrical peripheral surface comprises a transition zone at each end.

14. The keyless bushing assembly described in claim 13, wherein the length of each said transition zone on said outer cylindrical peripheral surface is about 4 to about 6 percent of the length of said outer cylindrical peripheral surface.

* * * * *